(12) United States Patent
Bhavaraju et al.

(10) Patent No.: US 9,876,253 B2
(45) Date of Patent: Jan. 23, 2018

(54) LOW VISCOSITY/HIGH CONDUCTIVITY SODIUM HALOALUMINATE ELECTROLYTE

(71) Applicant: FIELD UPGRADING USA, INC., Madison, WI (US)

(72) Inventors: Sai Bhavaraju, West Jordan, UT (US); Mathew Robins, Saratoga Springs, UT (US)

(73) Assignee: FIELD UPGRADING USA, INC., Denver, CO (US)

( * ) Notice: Subject to any disclaimer, the term of this patent is extended or adjusted under 35 U.S.C. 154(b) by 0 days.

(21) Appl. No.: 14/298,302

(22) Filed: Jun. 6, 2014

(65) Prior Publication Data

US 2014/0363717 A1 Dec. 11, 2014

Related U.S. Application Data

(60) Provisional application No. 61/831,691, filed on Jun. 6, 2013.

(51) Int. Cl.
| | |
|---|---|
| *H01M 10/08* | (2006.01) |
| *H01M 10/39* | (2006.01) |
| *H01M 10/054* | (2010.01) |

(52) U.S. Cl.
CPC ....... *H01M 10/054* (2013.01); *H01M 10/399* (2013.01); *H01M 2300/0048* (2013.01); *H01M 2300/0057* (2013.01)

(58) Field of Classification Search
CPC ........... H01M 10/054; H01M 10/0563; H01M 10/0567; H01M 10/399; H01M 2300/0048; H01M 2300/0057
See application file for complete search history.

(56) References Cited

U.S. PATENT DOCUMENTS

| | | | | |
|---|---|---|---|---|
| 3,847,667 | A * | 11/1974 | Werth | .......... 429/103 |
| 3,969,138 | A | 7/1976 | Werth et al. | |
| 4,335,191 | A * | 6/1982 | Peled | ............... 429/94 |
| 4,891,281 | A * | 1/1990 | Kuo et al. | ........... 429/105 |
| 4,894,298 | A | 1/1990 | Vukson et al. | |
| 4,973,534 | A | 11/1990 | Adendorff et al. | |
| 5,019,466 | A | 5/1991 | Coetzer et al. | |
| 5,053,294 | A | 10/1991 | Sernka et al. | |
| 6,007,943 | A | 12/1999 | Coetzer | |
| 6,187,479 | B1 * | 2/2001 | Liu | ............... 429/300 |
| 7,632,604 | B2 | 12/2009 | Iacovangelo et al. | |
| 8,968,902 | B2 | 3/2015 | Coors et al. | |
| 2002/0192553 | A1 | 12/2002 | Barker et al. | |
| 2003/0013021 | A1 * | 1/2003 | Wariishi | ........ 429/307 |
| 2005/0260460 | A1 | 11/2005 | Kishi et al. | |
| 2006/0141346 | A1 | 6/2006 | Gordon et al. | |
| 2008/0268327 | A1 | 10/2008 | Gordon et al. | |
| 2009/0134842 | A1 | 5/2009 | Joshi et al. | |
| 2010/0279174 | A1 | 11/2010 | Young | |
| 2010/0297537 | A1 | 11/2010 | Coors et al. | |
| 2011/0104526 | A1 | 5/2011 | Boxley et al. | |
| 2011/0199042 | A1 | 8/2011 | Abe | |
| 2011/0223460 | A1 | 9/2011 | Farmer | |
| 2012/0021273 | A1 * | 1/2012 | Ohmori et al. | ............... 429/144 |
| 2012/0129056 | A1 | 5/2012 | Majima et al. | |
| 2012/0164524 | A1 | 6/2012 | Bogdan et al. | |
| 2012/0219833 | A1 | 8/2012 | Coors et al. | |
| 2012/0315548 | A1 * | 12/2012 | Fujikawa et al. | ............. 429/330 |

(Continued)

FOREIGN PATENT DOCUMENTS

| | | |
|---|---|---|
| EP | 2485317 | 8/2012 |
| EP | 2490293 | 8/2012 |

(Continued)

OTHER PUBLICATIONS

Fuller, J., Osteryoung, R.A.—Rechargeable Lithium and Sodium Anodes in Chloroaluminate Molten Salts Containing Thionyl Chloride, J. Electrochem. Soc., vol. 142, No. 11, Nov. 1995, pp. 3632-3636.*

Lang, C., Kohl, P.A.—The Role of Additives in the Electroreduction of Sodium Ions in Chloroaluminate-Based Ionic Liquids, Journal of Electrochemical Society, 152(1), 2005, pp. E9-E13.*

Hueso, et al., "High Temperature Sodium Batteries: Status, challenges and future trends", *Energy & Environmental Science*, 2013, 6, 734-749, (Jan. 14, 2013),734-749.

Sudworth, J.L. "The sodium/nickel chloride (Zebra) battery", *Journal of Power Sources* 100 (2001) 149-163, (Jan. 1, 2001),149-163.

Shin, Ju C., "International Search Report", PCT Application No. PCT/US2014/054339 (Corresponding to U.S. Appl. No. 14/478,676), (dated Dec. 15, 2014),1-3.

Shin, Ju C., "Written Opinion of the International Searching Authority", PCT Application No. PCT/US2014/054339 (Corresponding to U.S. Appl. No. 14/478,676), (dated Dec. 15, 2014),1-3.

Yuki, Saori "Japanese Office Action", Japanese App No. JP2013-537914, (dated Sep. 8, 2015),1-8.

Motohiro, Fukuhara "English Language Abstract", KR20100027321, (Mar. 11, 2010),1.

Soo, et al., "English Language Abstract", KR20130098236, (Sep. 4, 2013),1.

(Continued)

*Primary Examiner* — Anca Eoff
(74) *Attorney, Agent, or Firm* — Foley & Lardner LLP

(57) ABSTRACT

An additive that is added to the $NaAlX_4$ electrolyte for use in a ZEBRA battery (or other similar battery). This additive has a moiety with a partial positive charge ($\delta+$) that attracts the negative charge of the $[AlX_4]^-$ moiety and weakens the ionic bond between the $Na^+$ and $[AlX_4]^-$ moieties, thereby freeing some $Na^+$ ions to transport (move). By using a suitable $NaAlX_4$ electrolyte additive, the battery may be operated at much lower temperatures than are typical of ZEBRA batteries (such as, for example, at temperatures between 150 and 200° C.). Additionally, the additive also lowers the viscosity of the electrolyte solution and improves sodium conductivity. Non-limiting examples of the additive $SOCl_2$, $SO_2$, dimethyl sulfoxide (DMSO, $CH_3SOCH_3$), $CH_3S(O)Cl$, $SO_2Cl_2$. A further advantage of using this additive is that it allows the use of a NaSICON membrane in a ZEBRA-type battery at lower temperatures compared to a typical ZEBRA battery.

18 Claims, 4 Drawing Sheets

(56) References Cited

U.S. PATENT DOCUMENTS

| | | |
|---|---|---|
| 2014/0210422 A1 | 7/2014 | Bhavaraju et al. |
| 2014/0212707 A1 | 7/2014 | Bhavaraju et al. |
| 2015/0086826 A1 | 3/2015 | Bhavaraju et al. |

FOREIGN PATENT DOCUMENTS

| | | | |
|---|---|---|---|
| GB | 2294803 | | 8/1996 |
| JP | 08321322 | | 12/1996 |
| JP | 2004178991 | | 6/2004 |
| JP | 2009009933 | | 1/2009 |
| KR | 20100027321 | | 3/2010 |
| KR | 20130098236 | | 9/2013 |
| WO | WO 2010/110465 | * | 9/2010 |
| WO | WO2010135283 | | 11/2010 |
| WO | WO 2011/104805 | * | 9/2011 |
| WO | WO2011104805 | | 9/2011 |
| WO | WO2011111566 | | 9/2011 |
| WO | WO2012115786 | | 8/2012 |
| WO | WO2012117916 | | 9/2012 |
| WO | WO2012132813 | | 10/2012 |

OTHER PUBLICATIONS

Cho, Ki Y., "International Search Report", PCT application US2011/059624 (Corresponding to U.S. Appl. No. 13/290,716), (dated May 22, 2012),1-3.

Cho, Ki Y., "Written Opinion of the International Searching Authority", PCT application US2011/059624 (Corresponding to U.S. Appl. No. 13/290,716), (dated May 22, 2012),1-3.

Totsuka, Kazuhide "Patent Abstracts of Japan (JP 08-321322)", English Language Abstract of Japanese patent publication JP 08-321322, (dated Dec. 3, 1996),1.

Bito, et al., "Bibliographical Data and Abstract of JP2004178991", Japanese Published Patent Application JP 2004178991, (Jun. 24, 2004),1.

Wang, et al., "Room temperature Na/S batteries with sulfur composite Cathode Material", *Electrochemistry Communications 9* (2007), Elsevier, (Jun. 18, 2006),31-34.

Shin, Ju C., "International Search Report", PCT Application No. PCT/US14/41329 (Corresponding to U.S. Appl. No. 14/298,302), (dated Oct. 2, 2014),1-3.

Shin, Ju C., "Written Opinion of the International Searching Authority", PCT Application No. PCT/US14/41329 (Corresponding to U.S. Appl. No. 14/298,302), (dated Oct. 2, 2014),1-6.

Kim, et al., "The Role of Additives in the Electroreduction of Sodium Ions in Chloroaluminate-Based Ionic Liquids", *Journal of the Electrochemical Society*, 2005, vol. 152, No. 1, pp. E9-E13, (Dec. 1, 2004),E9-E13.

Lang, et al., "Catalytic additivies for the reversible reduction of sodium in chloroaluminate ionic liquids", *Electrochimica Acta*, 2006, vol. 51, Iss. 19, pp. 3884-3889, (Dec. 27, 2005),3884-3889.

Choi, Sang W., "International Search Report", PCT Application No. PCT/US2014/0423698 (Corresponding to U.S. Appl. No. 14/205,019), (dated Jul. 29, 2014),1-3.

Choi, Sang W., "Written Opinion of the International Searching Authority", PCT Application No. PCT/US2014/0423698 (Corresponding to U.S. Appl. No. 14/205,019), (dated Jul. 29, 2014),1-6.

Shin, Ju C., "International Search Report", PCT Application No. PCT/US2014/40297 (Corresponding to U.S. Appl. No. 14/292,130), (dated Sep. 25, 2014),1-3.

Shin, Ju C., "Written Opinion of the International Searching Authority", PCT Application No. PCT/US2014/40297 (Corresponding to U.S. Appl. No. 14/292,130), (dated Sep. 25, 2014),1-6.

Shozo, Fujiwara "English Language Abstract", JP2009009933, (Jan. 15, 2009),1.

Cho, Han S., "International Search Report", PCT Application No. PCT/US14/57462 (Corresponding to U.S. Appl. No. 14/496,509), (dated Jan. 9, 2015),1-3.

Cho, Han S., "Written Opinion of the International Searching Authority", PCT Application No. PCT/US14/57462 (Corresponding to U.S. Appl. No. 14/496,509), (dated Jan. 9, 2015),1-4.

Shin, Ju C., "International Search Report", PCT Application No. PCT/US2014/024066 (Corresponding to U.S. Appl. No. 14/205,772), (dated Jun. 27, 2014),1-3.

Shin, Ju C., "Written Opinion of the International Searching Authority", PCT Application No. PCT/US2014/024066 (Corresponding to U.S. Appl. No. 14/205,772) (dated Jun. 27, 2014),1-6.

Li, et al., "Rechargeable Ni—Li Battery Integrated Aqueous/Non Aqueous System", Energy Technology Research Institute, National Institute of Advanced Industrial Science and Technology, (Oct. 5, 2009),15098-15099.

Carrico, Robert S., "Non-Final Office Action", U.S. Appl. No. 13/290,716, (dated Jul. 22, 2014),1-15.

Carrico, Robert S., "Notice of Allowance", U.S. Appl. No. 13/290,716, (dated Oct. 29, 2014),1-8.

Barcena, Carlos , "Notice of Allowance", U.S. Appl. No. 14/292,130, dated May 5, 2016, 1-13.

Carrico, Robert S. , "Non Final Office Action", U.S. Appl. No. 14/205,019, dated Jul. 15, 2016, 1-22.

Eoff, Anca , "Final Office Action", U.S. Appl. No. 14/298,302, dated May 9, 2016, 1-17.

Fujikawa, "English Bibliographic Data: WO2011104805", Sep. 1, 2011.

Ito, et al., "English Bibliographic Data: WO2012132813", Oct. 4, 2012.

Majima, et al., "English Bibliographic Data: WO2011111566", Sep. 15, 2011.

Muralidar, Richard V. , "Notice of Allowance", U.S. Appl. No. 14/478,676, May 9, 2016, 1-15.

Nitta, "English Bibliographic Data: WO2012117916", Sep. 7, 2012.

Ohmori, et al., "English Bibliographic Data: WO2010110465", Sep. 30, 2010.

Steinreiber, J. , "European Search Report", European Patent Application No. 14779822.7, dated Sep. 1, 2016, 110.

Steinreiber, J. , "European Search Report", European Patent Application No. 14744153.2, Sep. 1, 2016, 112.

Vij, "Cobalt (II) and Nickel (II) Bis (fluorosulphuryl) preparation and characterization", Bulletin De La Societe Chimique De France, Societe Francaise De Chime. Paris, France. vol. 3, Jan. 1, 1989 (Jan. 1, 1989), pp. 331-333, Jan. 1, 1989, 1-3.

Walls, Cynthia K. , "Notice of Allowance", U.S. Appl. No. 14/496,509, dated Aug. 24, 2016, 1-15.

Barcena, Carlos "Non Final Office Action", U.S. Appl. No. 14/292,130, (dated Dec. 8, 2015),1-9.

Carrico, Robert S. , "Final Office Action", U.S. Appl. No. 14/205,019, dated Jan. 26, 2017, 1-21.

Carrico, Robert S. , "Non Final Office Action", U.S. Appl. No. 14/205,772, dated Jul. 5, 2016, 1-21.

Jarvi, Tommi , "European Search Report", European Patent Application No. EP14808453, dated Dec. 1, 2016, 1-12

Lee, Dong W. , "International Search Report", PCT Application No. PCT/US16/27930 (Corresponding to U.S. Appl. No. 15/130,741)., Jul. 26, 2016, 1-3.

Lee, Dong W. , "Written Opinion of the International Searching Authority", PCT Application No. PCT/US16/27930 (Corresponding to U.S. Appl. No. 15/130,741), dated Jul. 26, 2016, 1-5.

* cited by examiner

LOW VISCOSITY/HIGH CONDUCTIVITY SODIUM HALOALUMINATE ELECTROLYTE

CROSS-REFERENCE TO RELATED APPLICATION

This application claims the benefit of U.S. Provisional Patent Application No. 61/831,691 filed Jun. 6, 2013, entitled LOW VISCOSITY/HIGH CONDUCTIVITY SODIUM HALOALUMINATE ELECTROLYTE. The foregoing application is incorporated by reference.

FIELD OF THE INVENTION

The present invention relates to batteries. More specifically, the present embodiments relate to methods for lowering the viscosity and increasing the conductivity of a sodium haloaluminate electrolyte used in an intermediate temperature sodium anode battery, thereby making the battery more efficient.

BACKGROUND OF THE INVENTION

A known type of battery is the so-called ZEBRA battery. Additional information regarding the "ZEBRA" battery (and a similar sodium/sulfur battery) can be found in the published literature, including Karina B. Hueso et al., "High temperature sodium batteries: status, challenges and future trends," Energy Environ. Sci., 14 Jan. 2013 and J. L. Sudworth, "The Sodium/nickel chloride (ZEBRA) battery," J. Power Sources, 100 (2001) pp. 149-163.

FIG. 1 shows a drawing of an exemplary cathode and anode that is used in a "ZEBRA" battery 100. The battery 100 includes a Ni cathode 116 and a molten Na metal anode 114. Electrolyte is used to carry charge between the anode and the cathode. This electrolyte may be a sodium haloaluminate ($NaAlX_4$) material such as $NaAlCl_4$, $NaAlBr_4$, or $NaAlI_4$. A NaSICON or Beta alumina membrane 115 is used to separate the anode from the electrolyte. The charge-discharge reactions are summarized below, for the embodiment where the halogen is chlorine:

(Anode) $2Na \leftrightarrow 2Na^+ + 2e^-$ 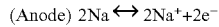

(Cathode) $NiCl_2 + 2Na^+ + 2e^- \leftrightarrow Ni + 2NaCl$ 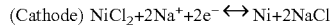

(Overall cell) $NiCl_2 + 2Na \leftrightarrow Ni + 2NaCl$, E=2.58V 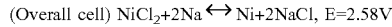

The foregoing oxidation/reduction reactions of Na and Ni produce the charge within the battery 100. The cathode is fabricated of a porous structure of nickel. The pores are impregnated with an electrolyte comprising $NaAlCl_4$. $NaAlCl_4$ has a melting point of about 157° C. Thus, the ZEBRA battery must be operated at a sufficiently high temperature to ensure that the $NaAlCl_4$ (or other sodium haloaluminate) is molten with a sufficiently low viscosity to enable penetration of the porous nickel cathode and sufficiently high conductivity of sodium ions.

In this battery during discharge, Na is oxidized at the anode to form sodium ions that transport across membrane 115. Nickel halide is converted to metallic nickel and sodium halide which becomes part of the molten $NaAlX_4$ electrolyte. During charge, sodium ions are transported across membrane 115 and reduced at the anode. The Ni cathode is oxidized to $NiX_2$.

One of the features of the ZEBRA battery is that it is typically operated at 300° C. or higher due to the ohmic resistance of the membrane 115 and the need to have the $NaAlX_4$ be molten. The high temperatures are used to ensure that the $NaAlX_4$ is molten and has a low viscosity so that the $Na^+$ ions may transport between the cathode materials and the membrane 115.

At about 300° C., the bond between the Na ion and the $[AlX_4]^-$ moiety weakens, as shown below:

$Na^+$ - - - $[AlX_4]^-$ 

The dashed line indicates that the bond weakens such that, for some of the $NaAlX_4$ species, the bond will actually break, thereby allowing $Na^+$ ions to transport. It is this weakening/breaking of the bonds that allows the battery to operate.

However, operating the ZEBRA battery at 300° C. can be cost-prohibitive as it requires a tremendous amount of energy to maintain the battery at that high temperature. Accordingly, there is a need in the art for a new type of battery that is similar to the ZEBRA battery that may be operated at lower temperatures. Such a device is disclosed herein.

BRIEF SUMMARY OF THE INVENTION

The present embodiments relate to an additive that is added to sodium haloaluminate ($NaAlX_4$) electrolyte for use in a ZEBRA battery (or other similar battery). The $NaAlX_4$ electrolyte may be represented by the formula $Na^+[AlX_4]^-$, where X is a halogen and an ionic bond exists between the $Na^+$ and $[AlX_4]^-$ moieties. The additive interacts with the $[AlX_4]^-$ moiety of the $NaAlX_4$, thereby weakening the ionic bond with the $Na^+$ ion and allowing some of the sodium ions to transport (move). In some non-limiting embodiments, the additive increases sodium conductivity by at least 10%. In other non-limiting embodiments, the additive increases sodium conductivity by at least 20%.

By using this additive, the battery may be operated at much lower temperatures than are typical of ZEBRA batteries. In some embodiments, this additive may allow the battery to be operated at temperatures in the range from 150 to 200° C. Additionally, the additive also lowers the viscosity of the electrolyte. In some non-limiting embodiments, the viscosity of the electrolyte is lowered by about 50%.

The additive may be combined with the sodium haloaluminate in an amount less than 50 mole % of the sodium haloaluminate.

The additive preferably has a moiety with a partial positive charge ($\delta^+$) that attracts the negative charge of the $[AlX_4]^-$ moiety and weakens the ionic bond between the $Na^+$ and $[AlX_4]^-$ moieties. In some non-limiting embodiments, the additive is selected from the following group of compounds: $SOCl_2$, $SO_2$, dimethyl sulfoxide (DMSO, $CH_3SOCH_3$), $CH_3S(O)Cl$, and $SO_2Cl_2$.

A further advantage of using this additive is that it may allow the use of a NaSICON membrane in the ZEBRA battery rather than a Beta Alumina membrane. NaSICON membranes provide specific advantages over Beta Alumina membranes, and thus it is beneficial to be able to use this type of membrane.

In some non-limiting embodiments, the halogen X is selected from chlorine, bromine, and iodine.

The disclosed invention also includes a molten sodium battery containing an electrolyte and additive. The battery includes a molten sodium metal negative electrode, which electrochemically oxidizes to release sodium ions during discharge and electrochemically reduces sodium ions to sodium metal during recharging. The battery further includes a positive electrode compartment comprising a positive electrode disposed in a positive electrolyte. The positive electrolyte may include a quantity of sodium haloaluminate as disclosed herein, represented by the formula $Na^+[AlX_4]^-$, where X is a halogen, wherein an ionic bond exists between the $Na^+$ and $[AlX_4]^-$ moieties. The sodium haloaluminate has a viscosity and a sodium ion conductivity. The positive electrolyte includes a quantity of an additive, as described herein, that lowers the viscosity of the sodium haloaluminate and increases the sodium ion conductivity of the sodium haloaluminate.

The molten sodium battery contains a sodium ion conductive electrolyte membrane that separates the molten sodium metal negative electrode from the positive electrolyte. In some non-limiting embodiment, the sodium ion conductive electrolyte membrane comprises a NaSICON-type material. In some non-limiting embodiments, the NaSICON-type material comprises a composite membrane having a porous layer and a dense functional layer. In operation, the sodium metal negative electrode is in contact with the conductive electrolyte membrane as the battery operates. The battery functions at an operating temperature between about 150° C. and about 200° C.

The disclosed invention includes a method of lowering the viscosity and increasing the sodium ion conductivity of a sodium haloaluminate battery electrolyte. The method includes obtaining a quantity of sodium haloaluminate, wherein the sodium haloaluminate is represented by the formula $Na^+[AlX_4]^-$, wherein an ionic bond exists between the $Na^+$ and $[AlX_4]^-$ moieties; and adding a quantity of an additive, as described herein, to the sodium haloaluminate to lower the viscosity of the sodium haloaluminate and increase the sodium ion conductivity of the sodium haloaluminate.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The present embodiments will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the methods and batteries of the present invention, as represented in the Figures, is not intended to limit the scope of the invention, as claimed, but is merely representative of present embodiments of the invention.

The present embodiments relate to additives that may be added to a sodium haloaluminate ($NaAlX_4$) electrolyte as a means of lowering the viscosity of this material, and thereby lowing the temperature required to operate the battery.

Figure 1:
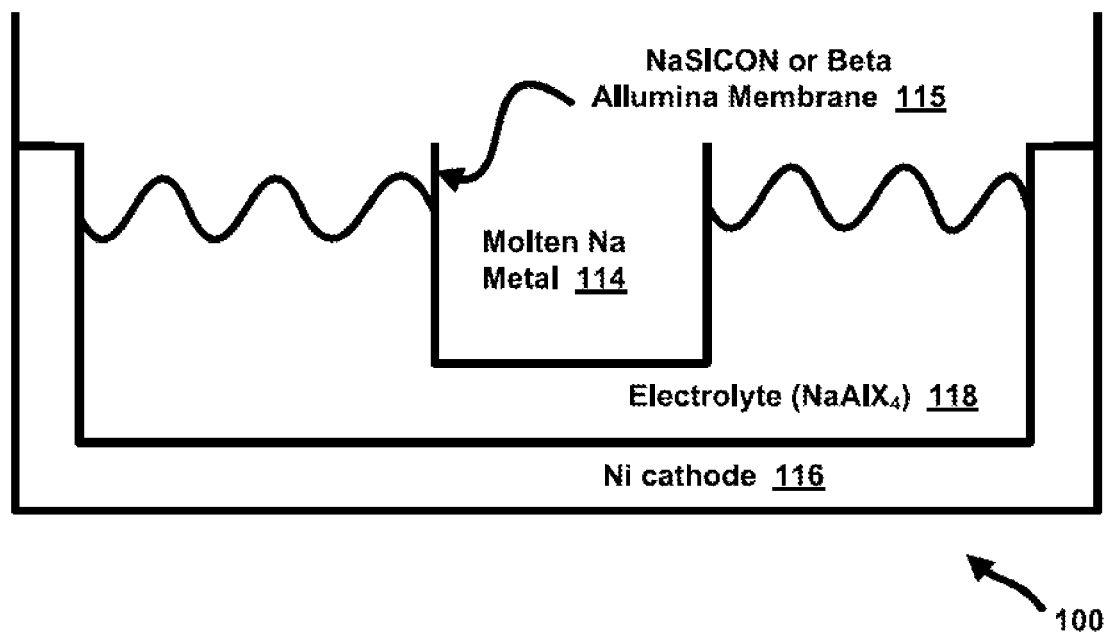
FIG. 1 shows an example of a battery, and more specifically, a ZEBRA battery.
Figure 2:
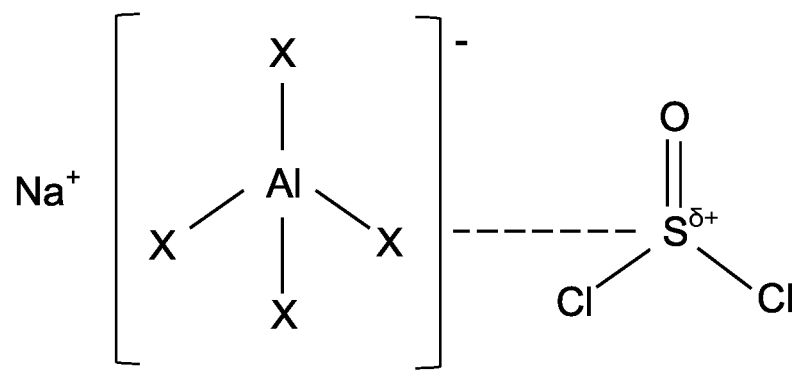
FIG. 2 shows the chemical interactions between an additive ($SOCl_2$) and the $NaAlX_4$ species, as described herein.

Specifically, as shown in FIG. 2, the electrolyte will include $NaAlX_4$. (In the embodiments shown in FIG. 2, the halide ($X^-$) moiety is a chloride ($Cl^-$) moiety; however, a bromide ($Br^-$) moiety or an iodide ($I^-$) moiety may likewise be used as the halide ($X^-$) moiety. The electrolyte also includes an additive, which in the embodiment of FIG. 2 comprises thionyl chloride ($SOCl_2$). Because the O and Cl moieties of the thionyl chloride are more electronegative than the sulfur, these moieties withdraw electrons from the sulfur (e.g., are "electron withdrawing groups"). This causes a slight positive charge on the sulfur atom (as represented by the "$\delta+$" superscript). This slight positive charge of the sulfur is attracted to the negatively charged $X^-$ moiety of the $[AlX_4]^-$ ion. In turn, this attraction between the S and the halide moiety of the $[AlX_4]^-$ ion weakens the bond between the sodium ion and the $[AlX_4]^-$ ion, thereby allowing some of the $Na^+$ ions to move throughout the electrolyte. At the same time, the additive $SOCl_2$ also operates to decrease the viscosity of the electrolyte. This reduction in viscosity further allows the $Na^+$ ions to flow through the system.

Figure 3:
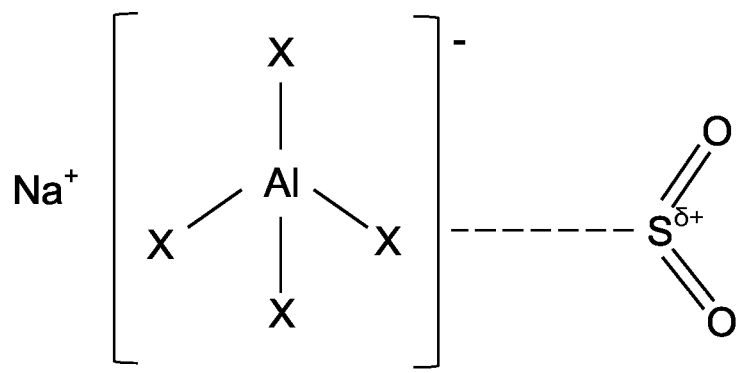
FIG. 3 shows the chemical interactions between an additive ($SO_2$) and the $NaAlX_4$ species, as described herein.

FIG. 3 shows the chemical interactions between an additive, sulfur dioxide ($SO_2$) and the $NaAlX_4$ species, in a manner similar to thionyl chloride described above. The sulfur atom has a slight positive charge on the sulfur atom (as represented by the "$\delta+$" superscript). This slight positive charge of the sulfur is attracted to the negatively charged $X^-$ moiety of the $[AlX_4]^-$ ion. In turn, this attraction between the S and the halide moiety of the $[AlX_4]^-$ ion weakens the bond between the sodium ion and the $[AlX_4]^-$ ion, thereby allowing some of the $Na^+$ ions to move throughout the electrolyte. At the same time, the additive $SO_2$ also operates to decrease the viscosity of the electrolyte. This reduction in viscosity further allows the $Na^+$ ions to flow through the system.

Figure 4:
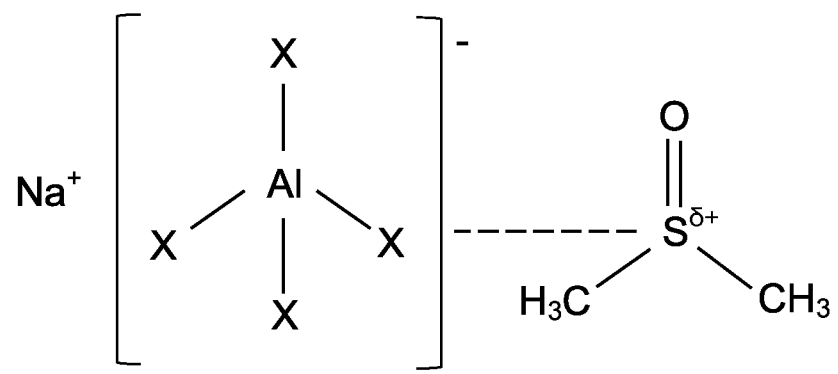
FIG. 4 shows the chemical interactions between an additive (DMSO, $CH_3SOCH_3$) and the $NaAlX_4$ species, as described herein.

FIG. 4 shows the chemical interactions between an additive, dimethyl sulfoxide (DMSO, $CH_3SOCH_3$) and the $NaAlX_4$ species, in a manner similar to thionyl chloride described above. The sulfur atom has a slight positive charge on the sulfur atom (as represented by the "$\delta+$" superscript). This slight positive charge of the sulfur is attracted to the negatively charged $X^-$ moiety of the $[AlX_4]^-$ ion. In turn, this attraction between the S and the halide moiety of the $[AlX_4]^-$ ion weakens the bond between the sodium ion and the $[AlX_4]^-$ ion, thereby allowing some of the $Na^+$ ions to move throughout the electrolyte. At the same time, the additive DMSO also operates to decrease the viscosity of the electrolyte. This reduction in viscosity further allows the $Na^+$ ions to flow through the system.

Figure 5:
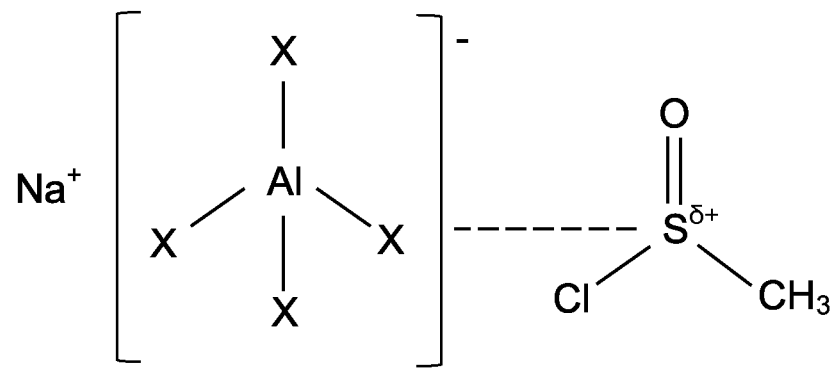
FIG. 5 shows the chemical interactions between an additive ($CH_3S(O)Cl$) and the $NaAlX_4$ species, as described herein.

FIG. 5 shows the chemical interactions between an additive, $CH_3S(O)Cl$ and the $NaAlX_4$ species, in a manner similar to thionyl chloride described above. The sulfur atom has a slight positive charge on the sulfur atom (as represented by the "$\delta+$" superscript). This slight positive charge of the sulfur is attracted to the negatively charged $X^-$ moiety of the $[AlX_4]^-$ ion. In turn, this attraction between the S and the halide moiety of the $[AlX_4]^-$ ion weakens the bond between the sodium ion and the $[AlX_4]^-$ ion, thereby allowing some of the $Na^+$ ions to move throughout the electrolyte. At the same time, the additive $CH_3S(O)Cl$ also operates to decrease the viscosity of the electrolyte. This reduction in viscosity further allows the $Na^+$ ions to flow through the system.

Figure 6:
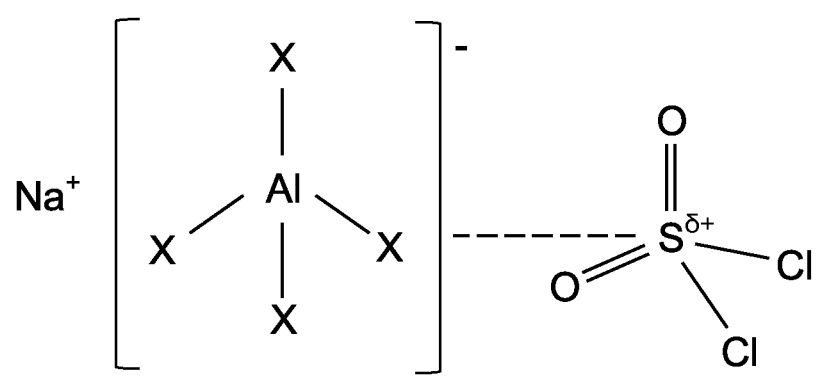
FIG. 6 shows the chemical interactions between an additive ($SO_2Cl_2$) and the $NaAlX_4$ species, as described herein.

FIG. 6 shows the chemical interactions between an additive, sulfuryl chloride ($SO_2Cl_2$) and the $NaAlX_4$ species, in a manner similar to thionyl chloride described above. The sulfur atom has a slight positive charge on the sulfur atom (as represented by the "δ+" superscript). This slight positive charge of the sulfur is attracted to the negatively charged $X^-$ moiety of the $[AlX_4]^-$ ion. In turn, this attraction between the S and the halide moiety of the $[AlX_4]^-$ ion weakens the bond between the sodium ion and the $[AlX_4]^-$ ion, thereby allowing some of the $Na^+$ ions to move throughout the electrolyte. At the same time, the additive sulfuryl chloride ($SO_2Cl_2$) also operates to decrease the viscosity of the electrolyte. This reduction in viscosity further allows the $Na^+$ ions to flow through the system.

By having the $Na^+$ ions transport through the system, the ZEBRA battery can be used to store power and subsequently release power, as desired. At the same time, the fact that the $Na^+$ ions can transport through the system means that the battery can be operated at lower temperatures (of between 150 to 200° C.) rather than the traditional temperature of 300° C. or greater. This lower operating temperature is much easier to achieve and maintain. Furthermore, a lower operating temperature results in costs savings as less resources need to be devoted to heating the battery to the proper temperature.

Further, because lower temperatures are available, the sodium ion conductive electrolyte membrane is no longer required to be Beta Alumina. Rather, embodiments may be constructed in which the membrane is made of NaSICON. NaSICON is a membrane material that is commercially available from Ceramatec, Inc. of Salt Lake City, Utah. U.S. Patent Application Publication No. 20070138020 describes the structure and properties of NaSICON as well as other membrane materials that may be used in the present embodiments. The entire disclosure of this published U.S. application is expressly incorporated herein by reference.

One of the features of NaSICON is the ability to create two distinctive environments on different sides of the membrane. This means that the solutions for the anolyte and catholyte may be different, the pressures on each side of the membrane may be different, the reactants and reaction conditions on each side of the membrane may be different, etc. In other words, the designer of the battery or secondary cell can tailor/select reactants/conditions for both the anolyte and catholyte that optimize each specific reaction. In some embodiments, the NaSICON membrane may have excellent conductivity (such as up to 100 mS/cm at 175° C.). The NaSICON membrane can be a supported membrane that is between 50-25 microns thick.

Additional embodiments may be designed in which the additive is a different chemical other than thionyl chloride, $SOCl_2$, $SO_2$, dimethyl sulfoxide (DMSO, $CH_3SOCH_3$), $CH_3S(O)Cl$, $SO_2Cl_2$, described above. It is understood that corresponding chemicals using a different halogen other than chlorine may be used. Moreover, other suitable additive chemicals may be used that have a moiety with a partial positive charge (δ+) that attracts the negative charge of the $[AlX_4]^-$ moiety and weakens the ionic bond between the $Na^+$ and $[AlX_4]^-$ moieties. Thus, other chemicals (such as polar chemicals) that can interact with the $[AlX_4]^-$ moieties in the manner outlined above and allow the $Na^+$ ions to transport may be used as the electrolyte additive. These electrolyte additives may operate to lower the viscosity of the electrolyte.

It should be noted that with respect to $SO_2$, this chemical may be used as either a gas or a liquid. Since the NaSICON membrane allows for different reaction conditions on either side of the membrane, the side with the $SO_2$ could be pressurized so that the $SO_2$ is in the liquid form.

All the patent applications and patents listed herein are expressly incorporated herein by reference.

What is claimed is:

1. A molten sodium battery cathode electrolyte consisting of:
   a quantity of molten sodium haloaluminate having a viscosity and a sodium ion conductivity, wherein the sodium haloaluminate is represented by the formula $Na^+[AlX_4]^-$, where X is a halogen, wherein an ionic bond exists between the $Na^+$ and $[AlX_4]^-$ moieties; and
   a quantity of an additive that lowers the viscosity of the sodium haloaluminate and increases the sodium ion conductivity of the sodium haloaluminate at a temperature in the range from 150 to 200° C., wherein the additive is present in an amount less than 50 mole % of the sodium haloaluminate.

2. The molten sodium battery cathode electrolyte of claim 1, wherein the additive has a moiety with a partial positive charge (δ+) that attracts the negative charge of the $[AlX_4]^-$ moiety and weakens the ionic bond between the $Na^+$ and $[AlX_4]^-$ moieties.

3. The molten sodium battery cathode electrolyte of claim 1, wherein the additive is selected from the group consisting of $SOCl_2$, $SO_2$, DMSO ($CH_3SOCH_3$), $CH_3S(O)Cl$, and $SO_2Cl_2$.

4. The molten sodium battery cathode electrolyte of claim 1, wherein X is selected from chlorine, bromine, and iodine.

5. The molten sodium battery cathode electrolyte of claim 1, wherein the viscosity of the electrolyte is lowered by about 50%.

6. The molten sodium battery cathode electrolyte of claim 1, wherein the sodium conductivity is increased by at least 10%.

7. A molten sodium battery comprising:
   a molten sodium metal negative electrode, which electrochemically oxidizes to release sodium ions during discharge and electrochemically reduces sodium ions to sodium metal during recharging;
   a positive electrode compartment comprising a positive electrode disposed in a positive electrolyte, wherein the positive electrolyte consists of:
     a quantity of molten sodium haloaluminate having a viscosity and a sodium ion conductivity, wherein the sodium haloaluminate is represented by the formula $Na^+[AlX_4]^-$, where X is a halogen, wherein an ionic bond exists between the $Na^+$ and $[AlX_4]^-$ moieties; and
     a quantity of an additive that lowers the viscosity of the sodium haloaluminate and increases the sodium ion conductivity of the sodium haloaluminate, wherein the additive is present in an amount less than 50 mole % of the sodium haloaluminate; and
   a sodium ion conductive electrolyte membrane that separates the molten sodium metal negative electrode from the positive electrolyte,
   wherein the sodium metal negative electrode is in contact with the conductive electrolyte membrane as the battery operates, and wherein the battery functions at an operating temperature between about 150° C. and about 200° C.

8. The molten sodium battery of claim 7, wherein the positive electrolyte additive has a moiety with a partial positive charge (δ+) that attracts the negative charge of the $[AlX_4]^-$ moiety and weakens the ionic bond between the $Na^+$ and $[AlX_4]^-$ moieties.

9. The molten sodium battery of claim 7, wherein the positive electrolyte additive is selected from the group consisting of $SOCl_2$, $SO_2$, DMSO ($CH_3SOCH_3$), $CH_3S(O)Cl$, and $SO_2Cl_2$.

10. The molten sodium battery of claim 7, wherein the sodium ion conductive electrolyte membrane comprises a NaSICON-type material.

11. The molten sodium battery of claim 10, wherein the NaSICON-type material comprises a composite membrane having a porous layer and a dense functional layer.

12. The molten sodium battery of claim 7, wherein X is selected from chlorine, bromine, and iodine.

13. A method of lowering the viscosity and increasing the sodium ion conductivity of a molten sodium battery, molten sodium haloaluminate cathode electrolyte comprising:
obtaining a quantity of sodium haloaluminate cathode electrolyte consisting of sodium haloaluminate, wherein the sodium haloaluminate is represented by the formula $Na^+[AlX_4]^-$, wherein an ionic bond exists between the $Na^+$ and $[AlX_4]^-$ moieties;
adding a quantity of an additive to the sodium haloaluminate to lower the viscosity of the sodium haloaluminate and increase the sodium ion conductivity of the sodium haloaluminate, wherein the additive is added in an amount that is less than 50 mole % of the sodium haloaluminate; and
heating the sodium haloaluminate to temperature in the range from 150 to 200° C.

14. The method of claim 13, wherein the additive has a moiety with a partial positive charge (δ+) that attracts the negative charge of the $[AlX_4]^-$ moiety and weakens the ionic bond between the $Na^+$ and $[AlX_4]^-$ moieties.

15. The method of claim 13, wherein the additive is selected from the group consisting of $SOCl_2$, $SO_2$, DMSO ($CH_3SOCH_3$), $CH_3S(O)Cl$, and $SO_2Cl_2$.

16. The method of claim 13, wherein X is selected from chlorine, bromine, and iodine.

17. The method of claim 13, wherein the viscosity of the electrolyte is lowered by about 50%.

18. The method of claim 13, wherein the sodium conductivity is increased by at least 10%.

* * * * *